United States Patent
Zhang et al.

(10) Patent No.: US 6,621,797 B1
(45) Date of Patent: Sep. 16, 2003

(54) SYSTEM FOR DETERMINING INDIVIDUAL CELL/POCKET LOSS IN ATM/IP NETWORKS AMONG ON-OFF SOURCES

(75) Inventors: Zhensheng Zhang, Fort Lee, NJ (US); Hongbin Ji, Robbinsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/271,812

(22) Filed: Mar. 18, 1999

(51) Int. Cl.$^7$ ................................................. H04J 1/16
(52) U.S. Cl. ..................... 370/252; 370/233; 370/234; 370/253
(58) Field of Search ................... 370/230, 232–233, 370/235, 235.1, 252, 395.1, 395.21, 253

(56) References Cited

U.S. PATENT DOCUMENTS

| | | | |
|---|---|---|---|
| 5,677,907 A | * 10/1997 | Hamada et al. | 370/253 |
| 6,046,983 A | * 4/2000 | Hasegawa et al. | 370/232 |
| 6,167,027 A | * 12/2000 | Aubert et al. | 370/230 |
| 6,459,681 B1 | * 10/2002 | Oliva | 370/232 |

* cited by examiner

Primary Examiner—Seema S. Rao
Assistant Examiner—Melanie Jagannathan

(57) ABSTRACT

The present invention includes a system for determining cell loss among on-off sources on a network by (a) receiving cells; and (b) measuring aggregate cell loss of said sources at port level. The method preferably includes determining aggregate cell loss of the sources; determining mean rate of each of the sources; determining burstiness of each of the sources; determining average burst length of each of the sources; determining buffer size; and approximating the cell loss ratio of each of the sources based substantially only upon the aggregate cell loss, the mean rate, the burstiness, and the average burst length. This approximation can be calculated using the formula:

$$\gamma_i = \gamma \frac{\sum_{i=1}^{N} r_j}{\sum_{i=1}^{N} A_j r_j} A_i$$

where $\gamma_i$ is individual cell loss ratio, $\gamma$ is aggregate cell loss ratio, $r_j$ is mean rate, and A is computed from the formula:

$$A_i = \sqrt{\frac{\sqrt{T_i B_i}}{\sqrt{T_i} + B}}$$

where $T_i$ is average burst length of each of said sources, $B_i$ is burstiness, and B is buffer size.

20 Claims, 1 Drawing Sheet

SYSTEM FOR DETERMINING INDIVIDUAL CELL/POCKET LOSS IN ATM/IP NETWORKS AMONG ON-OFF SOURCES

BACKGROUND OF THE INVENTION

1. Field of the Invention

The present invention relates to a system for determining distribution of individual cell loss among on-off sources, particularly to a system for approximating individual cell loss and determining distribution of individual cell loss among on-off sources.

2. Description of the Prior Art

There is an urgent need for communication networks to effectively support multimedia applications, as human beings become more and more dependent on networks to communicate with others who can be anywhere in the world. Accordingly, there is a tremendous need to develop sophisticated and intelligent networks which can serve and meet users' demand anytime and anywhere. However, multimedia applications have a wide range of traffic characteristics and quality-of-service (QoS) requirements. Up to now, only conventional ATM networks and IP networks have shown potential for supporting these applications.

A conventional ATM switch can support thousands of connections at the same time. Each of these connections has distinct traffic characteristics and dramatically differing QoS requirements. These switches have the distinct disadvantage that it is very difficult to make sure each of the individual QoS requirements are met. Practically, it is extremely difficult to monitor and measure the QoS each connection obtains from the network.

SUMMARY OF THE INVENTION

A system is therefore needed which can project the performance metrics for each individual connection based on the measurement at the switch aggregate level.

By assuming the incoming traffic is conforming to its declared traffic descriptors (i.e., leaky bucket parameters), information such as the peak cell rate (PCR), sustainable cell rate (SCR), and burst tolerance can be collected from each connection. Based on the measurement on cell loss ratio (CLR) at the aggregate level, an estimate for the CLR for each individual connection can be obtained. If the aggregated cell loss at port level are obtained through measurements and it is assumed that all of the sources have conforming traffic characteristics (usually based on leaky buckets parameters), then the individual cell loss for each connection can effectively be determined. This is particularly true if it is assumed that the connections generate heterogeneous on-off traffic with a given peak rate, mean active, and idle periods.

The present invention includes a system for determining cell loss among on-off sources on a network by determining aggregate cell loss of the sources; determining mean rate of each of the sources; determining burstiness of each of the sources; determining average burst length of each of the sources; determining buffer size; and approximating the cell loss ratio of each of the sources based substantially only upon the aggregate cell loss, the mean rate, the burstiness, and the average burst length.

This approximation can be calculated using the formula:

$$\gamma_i = \gamma \frac{\sum_{i=1}^{N} r_j}{\sum_{i=1}^{N} A_j r_j} A_i$$

where $\gamma_i$ is the individual cell loss ratio, $\gamma$ is the aggregate cell loss ratio, $r_j$ is the mean rate, and A is computed from the formula:

$$A_i = \sqrt{\frac{\sqrt{T_i} B_i}{\sqrt{T_i} + B}}$$

where $T_i$ is the average burst length of each of the sources, $B_i$ is the burstiness, and B is the buffer size.

DETAILED DESCRIPTION

Figure 1:
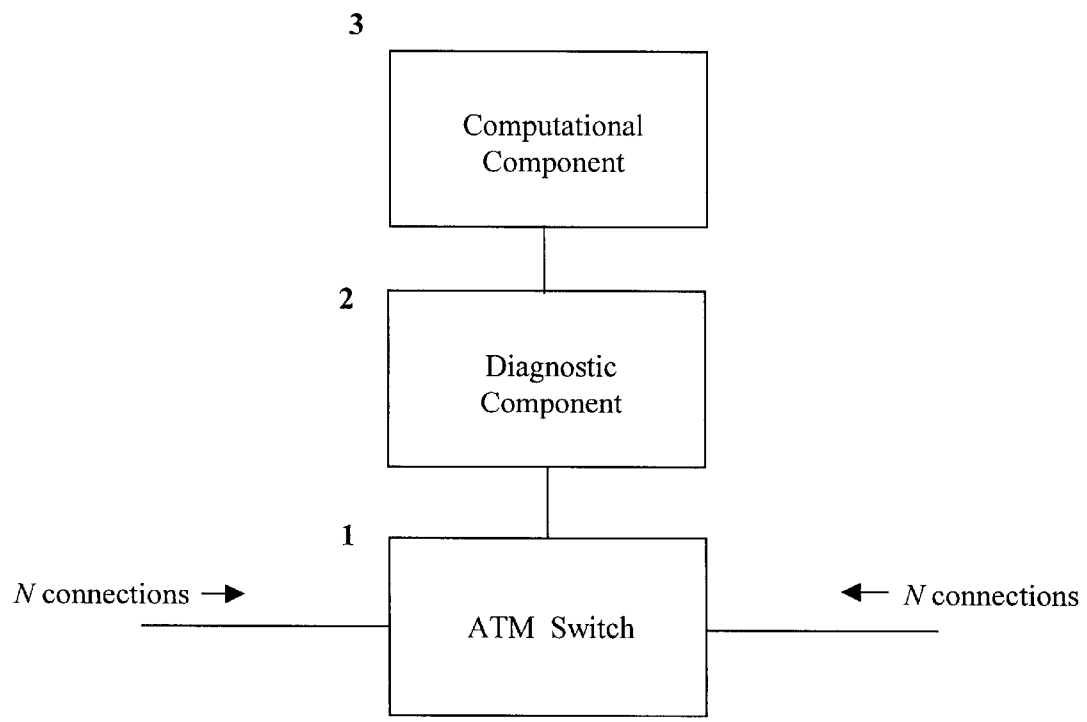
FIG. 1 is a block diagram illustrating a preferred embodiment of the present invention in an ATM network.

The present invention will be understood more fully from the detailed description given below and from accompanying drawings of preferred embodiments of the invention, which, however, should not be taken to limit the invention to a specific embodiment, but are for explanation and understanding only.

A preferred embodiment of the present invention used in an ATM network is illustrated in FIG. 1. As shown in FIG. 1, ATM Switch 1 receives and transmits N simultaneous connections through its ports (not shown). These connections are typically heterogeneous, as described in more detail below, but can also be homogeneous. These connections can be transmitted over a number of media well known to those of skill in the art, such as coaxial or fiber optic cable. Likewise, ATM Switch 1 can be comprise a conventional ATM switching component, having, for example, individual ports for one or more connections provided on integrated circuits cards, all of which are well known to those of ordinary skill in the art.

Alternatively, the present invention can be embodied in an IP network, with a network router, switch, or node, taking the place of ATM Switch 1. Such implementations are, of course, well known to those of ordinary skill in the art.

Diagnostic Component 2 is in communication with ATM Switch 1 to measure and compile traffic characteristics on the N individual traffic streams on the N connections on its ports. Diagnostic Component 2 comprises separate integrated circuitry from ATM Switch 1, connected through a conventional signal bus, or can be alternatively be integrated in into ATM Switch 1. Diagnostic Component 2 can use SNMP (Simple Network Management Protocol) queries to obtain relevant measurement information."

The preferred system of the present invention also includes Computational Component 3 for calculating the distribution of the individual cell loss of the N connections on ATM Switch 1 in the manner of the present invention described in more detail below. Computational Component 3 comprises separate integrated circuitry from ATM Switch 1 and Diagnostic Component 2, connected through a conventional signal bus, but can alternatively be integrated into ATM Switch 1 and/or Diagnostic Component 2. Computational Component 3 can include a microprocessor, random access memory (RAM), and read only memory (ROM) for performing the distribution calculation. The ROM contains program code for calculating the distribution and storing this information in the RAM or some other storage device, such as an electromagnetic disk or tape, an optical disk, and the like. The program code of the preferred embodiment of the present invention contains specific instructions for calculating the cell loss distribution in the manner described in more detail below.

Alternatively, Diagnostic Component 2 and Computational Component 3 can be implemented together in integrated circuitry which is separate from the ATM Switch 1. Diagnostic Component 2, and Computational Component 3 can be implemented together in circuitry within ATM Switch 1.

Alternatively, Diagnostic Component 2 and Computational Component 3 can be implemented as software layers, either together or separately, which function with the ATM Switch 1.

In conventional ATM systems, such as the one shown in FIG. 1, all of the simultaneous connections have distinct traffic characteristics and different QoS requirements. While it is not difficult to monitor the cell loss ratio at each port periodically, it is very difficult and often too expensive to monitor the individual cell loss ratio for each connection on a continuous basis.

However, it has been discovered that through this invention if the aggregated cell loss at port level are obtained through measurements and it is assumed that all of the sources have conforming traffic characteristics (usually based on leaky buckets parameters), then the individual cell loss for each connection can effectively be determined. This is particularly true if it is assumed that the connections generate heterogeneous on-off traffic with a given peak rate, mean active, and idle periods.

This result can be seen by considering a simple case where a strict condition is assumed. This simple case illustrates that cell loss is distributed among the sources proportionally to its burstiness. Moreover, the result holds for both bufferless and buffered systems (having any arbitrary buffer size).

The N heterogeneous on-off sources of ATM network illustrated in FIG. 1, have peak rate $p_i$, ON period $O_i$ and OFF period $F_i$, where $O_i$ and $F_i$ have arbitrarily distributions with mean $T_i$ and $Z_i$, respectively, for $i=1, 2, \ldots, N$. These N sources share a buffer of size B and a line with a bandwidth of C. Also, it is assumed that there exists a set of integers $(n_1, n_2, \ldots n_N)$ such that:

$$n_i (T_i + Z_i) = d, \text{ for } i=1, 2, \ldots, N, \quad (1)$$

where d is a constant.

This assumption can be easily satisfied, since the parameter d can be interpreted as a common period among the N streams. Parameter d is preferably chosen to be large enough such that the observation on the aggregate cell loss ratio reaches steady state.

It is also assumed that the link capacity will only be exceeded when all the sources are active. This can be represented as:

$$\sum_{i \neq j} p_i < C, \forall j \text{ and} \quad (2)$$

$$\sum_{i=1}^{N} p_i > C \quad (3)$$

Let $\gamma_i$ denote the cell loss ratio for the i-th source. The aggregate cell loss ratio is then $\gamma$. The mean rate of the i-th stream, denoted by $r_i$, is given by:

$$r_i = \frac{T_i p_i}{T_i + z_i} \quad (4)$$

The burstiness is denoted by $B_i$ and is the ratio of peak rate to mean rate:

$$B_i = \frac{p_i}{r_i} = \frac{T_i + Z_i}{T_i} \quad (5)$$

Based upon these assumptions, there is cell loss occurring at the aggregate level, which is distributed among the sources according to the following relationship:

$$\frac{\gamma_i}{\gamma_j} = \frac{B_{i'}}{B_{j'}} \forall i, j, \quad (6)$$

$$\gamma_i = \gamma \frac{\sum_{j=1}^{N} r_j}{\sum_{j=1}^{N} p_j} B_i \quad (7)$$

This can be demonstrated as follows. Under the second assumption above, we know that cell loss will occur only when all the sources become active. Suppose the time duration of the overlapping when all the sources becoming active is $\theta$ during the observation period d. The cell loss ratio of the i-th source is then the ratio of the number of cells lost to the number of cells generated during the observation period:

$$\gamma_i = \frac{\left(p_i - Cp_i \Big/ \sum_{j=1}^{N} p_j\right) \theta}{n_i T_i p_i} \quad (8)$$

Since the overlapping period $\theta$ is common for all the sources in this situation, the ratio of the CLR of the i-th and j-th sources cancel the common period and obtain equation (6) by noting that $$\frac{Bi}{Bj} = \frac{ni\, Ti}{nj\, Tj}$$

and utilizing equation (1). Since the cell loss ratio of the aggregate traffic is given by:

$$\gamma = \frac{\sum_{i=1}^{N} \gamma i\, n_i p_i T_i}{\sum_{i=1}^{N} n_i p_i T_i} \quad (9)$$

from the above equation, substituting (6) into (9) and solving for $\gamma_i$, yields:

$$\gamma_i = \frac{B_i \sum_{i=1}^{N} n_j p_j T_j}{\sum_{i=1}^{N} B_j n_j p_j T_j} \quad (10)$$

It should be noted that equation (7) is obtained from equation (10) when $B_j\, n_j\, T_j = d$ and $n_j\, T_j\, p_j = d\, r_j$.

This is true for both bufferless and buffered systems. Also, the result is independent of the buffer size and independent of the source's burst length. The individual cell loss ratio depends only on the source's peak, mean rate and burstiness. Additionally, when cell loss occurs at the aggregate traffic, cell loss will be distributed into each source proportional to its burstiness.

However, since the second assumption above is not always realistic, a more general case for the preferred embodiment of the invention is also considered. For bufferless systems, an explicit solution can be derived. However, for the buffered system, simulation and curve fitting must be used to derive an approximate expression for the cell loss in term of the aggregated cell loss. If a set of sources, $S_j$, is defined, such that when all the sources in the set become active at the same time, the link capacity will be exceeded, i.e.:

$$\sum_{i \in S_j} p_i > C, \text{ for } j = 1, 2, \ldots, K \quad (11)$$

where K denotes the total number of such sets. Further, each of the sets preferably has at least one distinct element from the others. In other words, none of the sets have exactly the same elements.

In a bufferless system, when all the sources in the set of $S_j$ become active, we will observe cell loss, for j=1, 2, ..., K. The probability of being in state $S_j$ (i.e., all the sources in the set of $S_j$ become active while the remaining sources are idle), denoted by $P_{S_j}$ is:

$$P_{S_j} = \prod_{i \in S_j} \frac{T_i}{T_i + Z_i} \prod_{i \notin S_j} \frac{Z_i}{T_i + Z_i} \quad (12)$$

Then, during the observation period d, the time duration of all the sources in the set $S_j$ being active, denoted by $\theta_j$, is given by $\theta_j = P_{S_j} d$. By supposing that i is in the set of $S_j$, and letting $\gamma_i^{S_j}$ denote the cell loss ratio for source i due to overlapping for all the sources in $S_j$, the following result is realized:

$$\gamma_i^{S_j} = \frac{\left(p_i - Cp_i / \sum_{l \in S_j} p_l\right)}{n_i T_i p_i} \theta_i, \forall i \in S_j, \forall j \quad (13)$$

The total cell loss ratio of the i-th stream is given by:

$$\gamma_i^{S_j} = \sum_{S_j \ni i} \gamma_i \quad (14)$$

From equations (13) and (14), noting that $$\frac{\theta_j}{T_i n_i} = \frac{d P_{S_j}}{T_i n_i} = B_i P_{S_j},$$

an explicit solution for the cell loss distribution in the bufferless case is achieved in the present invention as follows:

$$\gamma_i = \sum_{S_j \ni i} \left(1 - C / \sum_{S_j \in i} p_i \right) P_{S_j} B_i \quad (15)$$

The cell loss ratio of the aggregate traffic is given by:

$$\gamma = \frac{\sum_{i=1}^{N} \gamma_i n_i T_i p_i}{\sum_{i=1}^{N} n_i T_i p_i} \quad (16)$$

Thus, an exact formulae for the aggregate cell loss ratio is achieved in the present invention:

$$\gamma = \frac{\sum_{i=1}^{N} \sum_{S_j \ni i} \left(p_i - Cp_i / \sum_{l \in S_j} P_{S_j}\right)}{\sum_i^{N} r_i} \quad (17)$$

The above equation provides that cell loss ratio at the aggregate level is given by the average cell loss rate (conditioning on all possible states) divided by the average arrival rate.

Now, $\gamma_i$ can be found (assuming y is given), by letting:

$$\alpha = \sum_{S_j \ni i} \left(1 - C / \sum_{l \in S_j} p_l\right) P_{S_j} \quad (18)$$

Consequently, the following equation is obtained from equation (17) above:

$$\gamma_i = \frac{\alpha_i B_i}{\alpha_j B_j} \gamma_j, \forall i, j \quad (19)$$

By substituting (21) into (18) and solving for γj, the following equation is achieved:

$$\gamma_j = \gamma \frac{\alpha_j \sum_{i=1}^{N} r_i}{\sum_{i=1}^{N} \alpha_i p_i} B_i, \forall j \quad (20)$$

Thus, in the present invention, the cell loss ratio distribution does not depend on the burst length $T_i$. Furthermore, if the assumptions set forth above holds, $a_i = a$ for all i, then this equation reduces to equation 9, described above.

In a buffered system, where the previous assumptions do not necessarily hold, the computational complexity of equation (20) is very large when N is large, due to the need to compute $\alpha_i$, which requires a complex combinatorial calculation. Thus, in the present invention, an approximate expression of the individual cell loss in terms of the aggregate cell loss is derived, based on simulated results, for the individual cell loss ratio through curve fitting.

Based on the experimental results described in more detail below, the similar relationship of the equations (19) and (20) holds for the more general case. However, in, equation (19), the cell loss ratio does not depend on the buffer size, which is not true in the general case. If it is assumed that:

$$\frac{\gamma_i}{\gamma_j} = \frac{A_i}{A_j}, \forall\, i, j \quad (21)$$

with $A_i$ being having the form:

$$\left(\frac{(T_i B_i)^m}{(T_i)^n + B}\right)^l$$

where $T_i$ is the average burst length of source, and l, m, n are parameters to be determined by curve fitting. This is based upon the supposition that the cell loss ratio will increase as the source's average burst length increases, and will decrease as the buffer size increases. If the buffer size approaches to infinity, the cell loss ratio will become zero.

Through extensive simulation, it has been discovered that l=n=m=1/2 gives the best approximation to the cell loss ratio. That is:

$$A_i = \sqrt{\frac{\sqrt{T_i B_i}}{\sqrt{T_i} + B}} \quad (22)$$

and similar to equation (20):

$$\gamma_i = \gamma \frac{\sum_{i=1}^{N} r_j}{\sum_{i=1}^{N} A_j r_j} A_i \quad (23)$$

Thus, in the system of the present invention, the cell loss ratio of each connection can be approximated by dividing the aggregate cell loss ratio by an amount based upon the measured traffic parameters. Moreover, as shown in the experimental results set forth below, this approximation holds true even in the bufferless system (i.e. B is 0).

Numerical and Simulation Examples

The following are the results of test simulations utilizing an ATM network, which have been compared with the estimated results obtained from equation (23). For purposes of these experimental results, the peak rate of all sources are assumed to be the same and equal to one half of the line rate.

These results are illustrated in Tables 1–10, where the first column is the source identification, the second column is the simulation results, the third column is the estimated results obtained through the system of the present invention, the fourth column is the burst length of the sources and the last column is the load of each source.

Tables 1–10 cover a wide range of parameters. As shown in Tables 1–10, the cell loss ratio varies from 10-1 to 10-5, the burst length changes from 10 to 1000, the offered load is in the range of 0.009 to 0.8, and the buffer size varies from 0 to 300.

For all the cases considered, it can be seen that the estimation achieved in the manner of the present invention is quite close to the simulation results for substantially all of the sources. Even for the bufferless system, the results achieved in the manner of the present invention is very close to that of the complicated expression of equation (17). This factually demonstrates that the system of the present invention provides the significant advantage that it appears to capture the basic relationship of the individual cell loss ratio with the aggregate cell loss ratio in terms of the burst length, burstiness and the system buffer size using a single approximation.

TABLE 1

| source | simulation | estimation | burst length | load |
|---|---|---|---|---|
| 1 | 0.006778 | 0.006994 | 10.00 | 0.20 |
| 2 | 0.011982 | 0.011814 | 100.00 | 0.20 |
| 3 | 0.007759 | 0.008317 | 10.00 | 0.10 |
| 4 | 0.011893 | 0.011814 | 100.00 | 0.20 |
| 5 | 0.008431 | 0.010437 | 10.00 | 0.02 |
| 6 | 0.006830 | 0.006994 | 10.00 | 0.20 |
| 7 | 0.010932 | 0.011642 | 20.00 | 0.05 |
| 8 | 0.031838 | 0.029276 | 200.00 | 0.02 |
| 9 | 0.011562 | 0.014639 | 20.00 | 0.02 |

Buffer = 60,
Offered Load = 0.505449,
Aggregate loss = 0.009865

TABLE 2

| source | simulation | estimation | burst length | load |
|---|---|---|---|---|
| 1 | 0.080588 | 0.066742 | 10.00 | 0.20 |
| 2 | 0.105021 | 0.095848 | 100.00 | 0.20 |
| 3 | 0.128008 | 0.148980 | 1000.00 | 0.20 |
| 4 | 0.076335 | 0.051272 | 10.00 | 0.30 |
| 5 | 0.090558 | 0.086608 | 100.00 | 0.30 |
| 6 | 0.107481 | 0.134619 | 1000.00 | 0.30 |
| 7 | 0.089450 | 0.091176 | 10.00 | 0.03 |
| 8 | 0.133879 | 0.154013 | 100.00 | 0.03 |
| 9 | 0.161749 | 0.199390 | 1000.00 | 0.03 |

Buffer = 60,
Offered Load = 0.794502,
Aggregate loss = 0.098491

TABLE 3

| source | simulation | estimation | burst length | load |
|---|---|---|---|---|
| 1 | 0.072582 | 0.051741 | 10.00 | 0.20 |
| 2 | 0.095462 | 0.087400 | 100.00 | 0.20 |
| 3 | 0.117991 | 0.135850 | 1000.00 | 0.20 |
| 4 | 0.068366 | 0.046753 | 10.00 | 0.30 |
| 5 | 0.082242 | 0.078975 | 100.00 | 0.30 |
| 6 | 0.097081 | 0.122755 | 1000.00 | 0.30 |
| 7 | 0.080306 | 0.109419 | 10.00 | 0.01 |
| 8 | 0.130507 | 0.184830 | 100.00 | 0.01 |
| 9 | 0.159566 | 0.287289 | 1000.00 | 0.01 |

Buffer = 60,
Offered Load = 0.766364,
Aggregate loss = 0.088470

TABLE 4

| source | simulation | estimation | burst length | load |
|---|---|---|---|---|
| 1 | 0.000107 | 0.000095 | 10.0 | 0.01 |
| 2 | 0.000243 | 0.000172 | 100.0 | 0.01 |
| 3 | 0.000443 | 0.000280 | 1000.0 | 0.01 |
| 4 | 0.000036 | 0.000076 | 10.0 | 0.03 |
| 5 | 0.000154 | 0.000131 | 100.0 | 0.03 |
| 6 | 0.000190 | 0.000213 | 1000.0 | 0.03 |

TABLE 4-continued

| source | simulation | estimation | burst length | load |
| --- | --- | --- | --- | --- |
| 7 | 0.000084 | 0.000079 | 10.0 | 0.005 |
| 8 | 0.000204 | 0.000205 | 100.0 | 0.005 |
| 9 | 0.000285 | 0.000333 | 1000.0 | 0.005 |

Buffer = 100,
Offered Load = 0.068233,
Aggregate loss = 0.000159

TABLE 5

| source | simulation | estimation | burst length | load |
| --- | --- | --- | --- | --- |
| 1 | 0.006481 | 0.006361 | 10.00 | 0.10 |
| 2 | 0.011528 | 0.010954 | 100.00 | 0.10 |
| 3 | 0.019062 | 0.017807 | 1000.00 | 0.10 |
| 4 | 0.006162 | 0.005747 | 10.00 | 0.15 |
| 5 | 0.010401 | 0.009898 | 100.00 | 0.15 |
| 6 | 0.013966 | 0.016090 | 1000.00 | 0.15 |

Buffer = 100,
Offered Load = 0.374246,
Aggregate loss = 0.011030

TABLE 6

| source | simulation | estimation | burst length | load |
| --- | --- | --- | --- | --- |
| 1 | 0.000033 | 0.000038 | 10. | 0.01 |
| 2 | 0.000072 | 0.000065 | 100. | 0.01 |
| 3 | 0.000128 | 0.000106 | 1000. | 0.01 |
| 4 | 0.000026 | 0.000029 | 10. | 0.03 |
| 5 | 0.000050 | 0.000050 | 100. | 0.03 |
| 6 | 0.000056 | 0.000050 | 100. | 0.03 |

Buffer = 100,
Offered Load = 0.060308,
Aggregate loss = 0.000049

TABLE 7

| source | simulation | estimation | burst length | load |
| --- | --- | --- | --- | --- |
| 1 | 0.004048 | 0.004071 | 10.00 | 0.10 |
| 2 | 0.006003 | 0.007121 | 100.00 | 0.10 |
| 3 | 0.014699 | 0.012058 | 1000.00 | 0.10 |
| 4 | 0.004059 | 0.003679 | 10.00 | 0.15 |
| 5 | 0.005694 | 0.006435 | 100.00 | 0.15 |
| 6 | 0.010149 | 0.010895 | 1000.00 | 0.15 |
| 7 | 0.019921 | 0.029569 | 500.00 | 0.0015 |

Buffer = 200,
Offered Load = 0.379186,
Aggregate loss = 0.007346

TABLE 8

| source | simulation | estimation | burst length | load |
| --- | --- | --- | --- | --- |
| 1 | 0.002055 | 0.002267 | 10.00 | 0.10 |
| 2 | 0.003110 | 0.003987 | 100.00 | 0.10 |
| 3 | 0.009407 | 0.006855 | 1000.00 | 0.10 |
| 4 | 0.002273 | 0.002049 | 10.00 | 0.15 |
| 5 | 0.003077 | 0.003603 | 100.00 | 0.15 |
| 6 | 0.005754 | 0.006194 | 1000.00 | 0.15 |
| 7 | 0.010931 | 0.016707 | 500.00 | 0.0015 |

Buffer = 300,
Offered Load = 0.372676,
Aggregate loss = 0.004142

TABLE 9

| source | simulation | estimation | burst length | load |
| --- | --- | --- | --- | --- |
| 1 | 0.001486 | 0.001505 | 10.00 | 0.10 |
| 2 | 0.001574 | 0.002658 | 100.00 | 0.10 |
| 3 | 0.006273 | 0.004629 | 1000.00 | 0.10 |
| 4 | 0.001545 | 0.001360 | 10.00 | 0.15 |
| 5 | 0.002105 | 0.002402 | 100.00 | 0.15 |
| 6 | 0.004075 | 0.004183 | 1000.00 | 0.15 |
| 7 | 0.008542 | 0.011221 | 500.00 | 0.0015 |

Buffer = 500,
Offered Load = 0.374581,
Aggregate loss = 0.002778

TABLE 10

| source | simulation | estimation | burst length | load |
| --- | --- | --- | --- | --- |
| 1 | 0.001830 | 0.002204 | 10. | 0.01 |
| 2 | 0.006178 | 0.005689 | 100. | 0.01 |
| 3 | 0.008898 | 0.007625 | 1000. | 0.01 |
| 4 | 0.001450 | 0.001120 | 10. | 0.15 |
| 5 | 0.001728 | 0.001875 | 100. | 0.15 |
| 6 | 0.002060 | 0.002858 | 1000. | 0.15 |
| 7 | 0.010596 | 0.011857 | 10000. | 0.0015 |

Buffer = 50,
Offered Load = 0.240476,
Aggregate loss = 0.002099

Although the present invention has been described in its preferred embodiments with reference to the accompanying drawings, it can be readily understood that the present invention is not restricted to the preferred embodiments and that various changes and modifications can be made by those skilled in the art without departing from the spirit and scope of the present invention.

What is claimed is:

1. A method of determining cell loss among on-off sources on a network comprising the steps of:

(a) measuring aggregate cell loss ratio of said sources;

(b) measuring mean rate of each of said sources;

(c) measuring burstiness of each of said sources;

(d) measuring average burst length of each of said sources;

(e) determining buffer size of said network;

(f) calculating an approximation of cell loss ratio of each of said sources based substantially only upon said aggregate cell loss ratio, said mean rate, said burstiness, said buffer size, and said average burst length.

2. The method of claim 1, wherein said approximation is calculated using the formula:

$$\gamma_i = \gamma \frac{\sum_{i=1}^{N} r_j}{\sum_{i=1}^{N} A_j r_j} A_i$$

where $\gamma_i$ is individual cell loss ratio, $\gamma$ is aggregate cell loss ratio, $r_j$ is mean rate, and A is computed from the formula:

$$A_i = \sqrt{\frac{\sqrt{T_i B_i}}{\sqrt{T_i} + B}}$$

where $T_i$ is average burst length of each of said sources, $B_i$ is burstiness, and B is buffer size.

3. The method of claim 1, wherein said network is an ATM network.

4. The method of claim 1, wherein said network is an IP network.

5. The method of claim 1, wherein said network is a buffered network.

6. The method of claim 1, wherein said network is a bufferless network.

7. A method of determining cell loss among on-off sources on a network having a buffer size, B, comprising the steps of:
(a) measuring aggregate cell loss ratio, $\gamma$, of said sources;
(b) measuring mean rate, $r_j$, of each of said sources;
(c) measuring peak rate, $P_j$, of each of said sources;
(d) measuring average burst length, $T_i$, of each of said sources; and
(e) calculating an approximation of the cell loss ratio of each of said sources, wherein said approximation is calculated using the formula:

$$\gamma_i = \gamma \frac{\sum_{i=1}^{N} r_j}{\sum_{i=1}^{N} A_j r_j} A_i$$

and A is computed from the formula:

$$A_i = \sqrt{\frac{\sqrt{T_i B_i}}{\sqrt{T_i} + B}}.$$

8. The method of claim 7, wherein said network is an ATM network.

9. The method of claim 7, wherein said network is an IP network.

10. The method of claim 7, wherein said network is a buffered network.

11. The method of claim 7, wherein said network is a bufferless network.

12. An apparatus for distributing cell loss among on-off sources on a network comprising:
(a) at least one network node connected to each of said sources;
(b) a diagnostic component connected to said node for collecting information for each of said sources on said network; and
(c) a computational component capable of receiving said information for each of said sources on said network and
(i) measuring aggregate cell loss ratio of said sources;
(ii) measuring mean rate of each of said sources;
(iii) measuring peak rate of each of said sources;
(iv) measuring average burst length of each of said sources; and
(v) calculating an approximation of cell loss ratio of each of said sources based substantially only upon said aggregate cell loss ratio, said mean rate, said burstiness, and said average burst length.

13. The apparatus of claim 12, wherein said approximation is calculated using the formula:

$$\gamma_i = \gamma \frac{\sum_{i=1}^{N} r_j}{\sum_{i=1}^{N} A_j r_j} A_i$$

where $\gamma_i$ is individual cell loss ratio, $\gamma$ is aggregate cell loss ratio, $r_j$ is mean rate, and A is computed from the formula:

$$A_i = \sqrt{\frac{\sqrt{T_i B_i}}{\sqrt{T_i} + B}}$$

where $T_i$ is average burst length of each of said sources, $B_i$ is burstiness, and B is buffer size.

14. The apparatus of claim 12, wherein said network node is an ATM switch.

15. The apparatus of claim 12, wherein said network is an ATM network.

16. The apparatus of claim 12, wherein said network is an IP network.

17. The apparatus of claim 12, wherein said network is a buffered network.

18. The apparatus of claim 12, wherein said network is a bufferless network.

19. The apparatus of claim 12, wherein said diagnostic component is implemented in electronic circuitry and said computational component is implemented in electronic circuitry.

20. The apparatus of claim 12 wherein said diagnostic component and said computational component is implemented in software.

* * * * *